United States Patent
Kusumi et al.

(10) Patent No.: US 10,184,406 B2
(45) Date of Patent: Jan. 22, 2019

(54) MULTI-SHAFT VARIABLE SPEED GAS TURBINE APPARATUS AND METHOD OF CONTROLLING THE SAME

(71) Applicant: Hitachi, Ltd., Chiyoda-ku, Tokyo (JP)

(72) Inventors: Naohiro Kusumi, Tokyo (JP); Noriaki Hino, Tokyo (JP); Aung Ko Thet, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 28 days.

(21) Appl. No.: 15/315,140

(22) PCT Filed: Jun. 18, 2014

(86) PCT No.: PCT/JP2014/066084
§ 371 (c)(1),
(2) Date: Nov. 30, 2016

(87) PCT Pub. No.: WO2015/193979
PCT Pub. Date: Dec. 23, 2015

(65) Prior Publication Data
US 2017/0138272 A1    May 18, 2017

(51) Int. Cl.
*F02C 9/28* (2006.01)
*F02C 7/057* (2006.01)
(Continued)

(52) U.S. Cl.
CPC .......... *F02C 9/28* (2013.01); *F02C 7/057* (2013.01); *F02C 7/36* (2013.01); *H02K 7/14* (2013.01);
(Continued)

(58) Field of Classification Search
CPC ........ F02N 11/04; B60W 10/06; B60W 10/08
(Continued)

(56) References Cited

U.S. PATENT DOCUMENTS 5,301,499 A * 4/1994 Kure-Jensen ......... F01K 23/108
                                                        60/39.182
9,121,309 B2 * 9/2015 Geiger .................... F01D 21/06
(Continued)

FOREIGN PATENT DOCUMENTS

JP        2007-505261 A      3/2007
JP        2010-25069 A       2/2010
(Continued)

OTHER PUBLICATIONS

International Search Report issued in PCT Application No. PCT/JP2014/066084 dated Jul. 22, 2014 with English translation (Four (4) pages).

*Primary Examiner* — Tulsidas C Patel
*Assistant Examiner* — Charles Reid, Jr.
(74) *Attorney, Agent, or Firm* — Crowell & Moring LLP

(57) ABSTRACT

A multi-shaft variable speed gas turbine apparatus includes a multi-shaft gas turbine having a gas turbine compressor, a gas turbine burner, a gas generator provided with a first turbine for rotationally driving the gas turbine compressor, and a power turbine, provided with a second turbine that is mechanically separated from the gas generator, rotationally driven by exhaust gas of the gas generator, and having a main generator. A sub-electric motor/generator is connected to the gas generator, and a frequency converter controls the sub-electric motor/generator. A fuel flow rate control valve adjusts output using a fuel flow rate to be injected into the gas turbine burner. Variation of the fuel flow rate is restricted, and a control device determines a drive load of the gas turbine compressor in accordance with an output load for a request load, and controls the sub-electric motor/generator using the frequency converter.

8 Claims, 8 Drawing Sheets

(51) Int. Cl.
*F02C 7/36* (2006.01)
*H02K 7/14* (2006.01)
*H02K 7/18* (2006.01)
*H02P 9/04* (2006.01)

(52) U.S. Cl.
CPC ............ *H02K 7/1823* (2013.01); *H02P 9/04* (2013.01); *F05D 2220/32* (2013.01); *F05D 2220/76* (2013.01); *F05D 2260/80* (2013.01); *F05D 2270/335* (2013.01); *Y02E 20/16* (2013.01)

(58) Field of Classification Search
USPC .......................................................... 290/34
See application file for complete search history.

(56) References Cited

U.S. PATENT DOCUMENTS

| | | | |
|---|---|---|---|
| 9,869,249 B2 * | 1/2018 | Cigal | ........................ F02C 7/00 |
| 2005/0056021 A1 | 3/2005 | Belokon et al. | |
| 2006/0150633 A1 | 7/2006 | McGinley et al. | |

FOREIGN PATENT DOCUMENTS

| | | | | |
|---|---|---|---|---|
| JP | 2010025069 A | * | 2/2010 | |
| JP | 4513936 B2 | | 7/2010 | |
| JP | 2013-177860 A | | 9/2013 | |
| JP | 2013177860 A | * | 9/2013 | |

* cited by examiner

| PID NUMBER | PID150 | PID151 | PID152 | PID153 | PID154 | ... |
|---|---|---|---|---|---|---|
| TIME | F | T | P | E | D | |
| YEAR/MONTH/DATE, HOUR:MINUTE:SECOND | Kg/s | °C | Mpa | MW | ppm | ... |
| 2010/01/01 0:00:00 | 300 | 580 | 18.5 | 450 | 100 | ... |
| 2010/01/01 0:00:01 | 300 | 579 | 18.5 | 450 | 100 | ... |
| 2010/01/01 0:00:02 | 300 | 579 | 18.5 | 450 | 98 | ... |
| ... | ... | ... | ... | ... | ... | ... |

FIG. 11

| NAME | RANGE | | |
|---|---|---|---|
| | LOWER-LIMIT | UPPER-LIMIT | |
| ▼ | | | (kg/s) |
| ▼ | | | (%) |
| ▼ | | | (%) |
| ▼ | | | (%) |
| ▼ | | | (%) |

TREND DISPLAY SETTING  ×

○ MEASUREMENT SIGNAL DISPLAY — 981

982 — TIME [ ] TO [ ]

983 — DISPLAY

989 — RETURN

MULTI-SHAFT VARIABLE SPEED GAS TURBINE APPARATUS AND METHOD OF CONTROLLING THE SAME

TECHNICAL FIELD

The present invention relates to a gas turbine apparatus including a multi-shaft gas turbine with variable speed, driven by a motor.

BACKGROUND ART

A thermal power plant generates power by driving a power generating device using heat of combustion acquired by burning mainly fossil fuel, and there are various devices according to combinations of fuel and power generating devices. For example, there are devices such as: a device that generates power by driving a steam turbine using steam generated by heat of combustion acquired by burning coal, heavy oil, or the like in a boiler; a gas turbine power generator that generates power by driving a gas turbine using combustion air acquired by burning a mixture of air compressed by a compressor and fuel in a burner; and a combined cycle power generator that drives a steam turbine using steam generated in an exhaust heat recovery boiler by using exhaust gas burned in a gas turbine.

A gas turbine decreases in output in a case where atmosphere temperature is high, such as summer, because air density in the atmosphere is low to cause a mass flow rate of air taken and compressed by a compressor to decrease. In addition, increase in the number of years operated deteriorates output due to aging degradation.

CITATION LIST

Patent Literature

PTL 1: JP-4513936-B2

SUMMARY OF INVENTION

Technical Problem

PTL 1 describes a control method of compensating for output deterioration by correcting a fuel flow rate using gain correction according to rotation speed deviation to prevent the output deterioration due to aging degradation.

As described above, a gas turbine decreases in a mass flow rate of air taken when atmosphere temperature rises. As a result, a ratio of fuel relatively increases to cause exhaust temperature to be higher than usual. Since the gas turbine has an upper limit value of exhaust temperature that is set from a viewpoint of material, a fuel flow rate cannot be increased to a value exceeding the upper limit value. In addition to during normal operation, restriction is provided during load rejection in which load is rapidly interrupted so that rotation speed on a generator side rises within a range without losing synchronization. In the method described in PTL 1, the fuel flow rate control according to rotation speed deviation causes exhaust temperature to tend to easily reach the limit value when atmosphere temperature is high, for example. In addition, increasing rotation speed reduces a margin for an upper limit of rotation speed due to overspeed during load rejection, thereby impairing safety.

To solve the problem described above, output deteriorated due to atmosphere temperature or aging degradation is reversed in a system including a gas turbine, particularly a multi-shaft gas turbine whose compressor side has variable speed driven by a motor by increasing a mass flow rate of taken air by inputting motor torque to a compressor shaft. In addition, surplus energy on a generator side is transferred to the compressor side in a case where overspeed is caused during load rejection to absorb the overspeed in compressor rotation speed, thereby preventing safety from being impaired. It is an object of the present invention to provide a device and a method of controlling the device, as described above.

Solution to Problem

To solve the problem described above, a multi-shaft variable speed gas turbine apparatus and a method of controlling the apparatus, according to the present invention, includes functions below.

The multi-shaft variable speed gas turbine apparatus according to the present invention includes: a multi-shaft gas turbine having a gas turbine compressor, a gas turbine burner, a gas generator provided with a first turbine for rotationally driving the gas turbine compressor, and a power turbine provided with a second turbine that is mechanically separated from the gas generator, and that is rotationally driven by exhaust gas of the gas generator, and with a main generator; a sub-electric motor/generator connected to the gas generator; a frequency converter that controls the sub-electric motor/generator; fuel flow rate control means for adjusting output by using a fuel flow rate to be injected into the gas turbine burner; restriction means for restricting variation of the fuel flow rate; and a control device that determines a drive load of the gas turbine compressor in accordance with an output load for a request load, and controls the sub-electric motor/generator by using the frequency converter. Alternatively, there is provided a control device that controls surplus energy during load rejection to be transferred to the gas turbine compressor.

Advantageous Effects of Invention

In the multi-shaft variable speed gas turbine apparatus and a method of controlling the apparatus according to the present invention, compressor power is recovered by applying motor torque to the compressor during partial load operation, and thus partial load efficiency is improved. In a configuration of a combined cycle plant, a motor connected to a compressor side serves as a generator, and thus applying a load to the compressor increases exhaust temperature at partial load, thereby improving efficiency of the entire plant.

BRIEF DESCRIPTION OF DRAWINGS

FIG. 11 illustrates a display setting screen showing a measurement signal, related information, and setting conditions, displayed in the image display device according to the embodiment of the present invention.

DESCRIPTION OF EMBODIMENTS

A multi-shaft variable speed gas turbine apparatus and a method of controlling the apparatus according to a preferred embodiment will be described below with reference to accompanying drawings.

Figure 1:
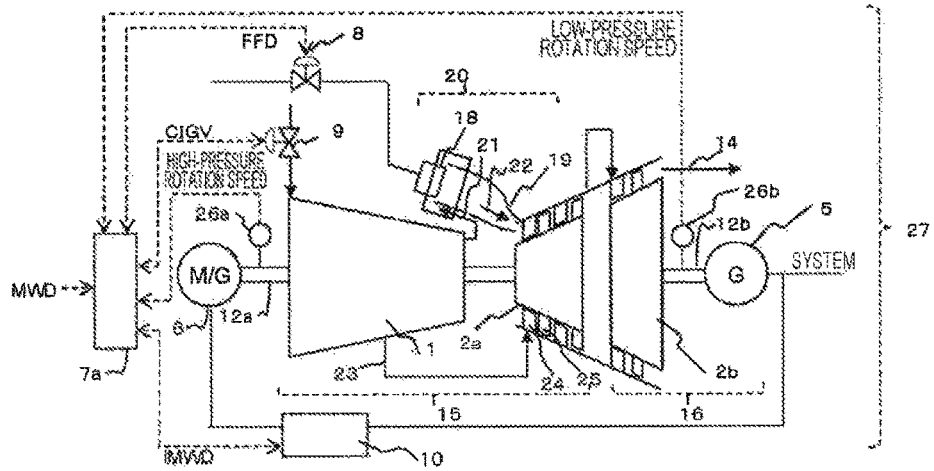
FIG. 1 illustrates a 2-shaft gas turbine power generator according to an embodiment of the present invention.

FIG. 1 illustrates principal devices of a 2-shaft gas turbine power generator according to the present embodiment. A 2-shaft type gas turbine 27 is configured to include a gas generator 15, a power turbine 16, a GT control device 7a, and a frequency converter 10.

The power turbine 16 is configured to include a low-pressure turbine 2b, a low-pressure turbine shaft 12b, and a generator 5. To obtain a substantially constant power frequency in power generation, the power turbine 16 is rotated at a substantially constant rotation speed to drive the generator 5 at a substantially constant rotation speed. Electric power generated by the generator 5 is transmitted to electric power customers through an electric power cable.

The gas generator 15 is configured to include a compressor 1, a burner 20, a high-pressure turbine 2a, a sub-electric motor/generator 6, and a high-pressure turbine shaft 12a.

The gas generator 15 is configured to be mechanically separated from the power turbine 16. Thus, the gas generator 15 can be rotationally driven at a rotation speed different from that of the power turbine.

The compressor 1 sucks air and compresses the air to generate compressed air 21. In addition, the compressor 1 includes an inlet guide vane (IGV) in its inlet. The IGV 9 itself rotates to vary an area of an opening of the compressor 1. Varying the opening enables an amount of air flowing into the compressor 1 to be varied.

The amount of air flowing into the compressor 1 also can be adjusted by varying a rotation speed of gas generator 15.

The burner 20 allows a mixture of the compressed air 21 generated by the compressor 1 and fuel to be burned in a combustion burner 18 to generate combustion gas 22. The combustion gas 22 first flows into the high-pressure turbine 2a through a burner liner 19. The fuel burned in the combustion burner 18 is adjusted by a fuel flow rate control valve 8 provided in a fuel pipe.

The high-pressure turbine 2a obtains turning force by using energy of the combustion gas 22 at high temperature under high pressure. The turning force is transmitted to the compressor 1 through the gas generator shaft to rotationally drive the compressor 1. The high-pressure turbine 2a extracts a part of energy of the combustion gas 22, and then the combustion gas 22 flows into the low-pressure turbine 2b of the power turbine 16. The low-pressure turbine 2b obtains turning force by using the energy of the combustion gas 22, and transmits the turning force to the generator 5 through the low-pressure turbine shaft 12b to rotationally drive the generator 5. The combustion gas 22 passing through the low-pressure turbine is discharged as exhaust air 14.

A part of air compressed by the compressor 1 is bled as turbine cooling air 23, and is supplied to the high-pressure turbine 2a or the low-pressure turbine 2b without passing through the burner 20. A part of the cooling air 23 is used to cool stator vanes 24 and rotor vanes 25 constituting the turbine 2a.

The sub-electric motor/generator 6 connected to the high-pressure turbine shaft 12a is connected to an electric power system through the frequency converter 10, and can adjust operation of the high-pressure turbine shaft by giving and receiving electric power with the electric power system. Specifically, supplying electric power to the sub-electric motor/generator 6 by using the frequency converter 10 allows the sub-electric motor/generator 6 to serve as a motor to supply energy to the high-pressure turbine shaft 12a. Conversely, extracting electric power by using the frequency converter 10 allows the sub-electric motor/generator 6 to serve as a generator to enable energy of the high-pressure turbine shaft 12a to be reduced.

A GT control device 7a operates so as to receive input including high-pressure turbine rotation speed detected by a high-pressure turbine rotation speed detector 26a, low-pressure turbine rotation speed detected by a low-pressure turbine rotation speed detector 26b, and an output command (MWD), and to transmit a signal including a FFD signal for controlling the fuel flow rate control valve 8, a CIGV signal for controlling an opening of the IGV 9, and an IMWD signal for controlling output electric power of the frequency converter 10. The control device 7a may be configured so as to have various protection functions.

The technical main point of the present example includes not only output control by controlling a fuel flow rate, but also a configuration in which when output is required to be increased, reducing rotation speed of the high-pressure turbine shaft 12a enables rotational energy of the shaft to be released as electric power, and when output is required to be reduced, increasing rotation speed of the high-pressure turbine shaft 12a enables electric power to be stored as rotational energy of the shaft, for example. Thus, high output varying speed can be obtained by output varying means without using a fuel flow rate, while reduction in lifetime caused by thermal fatigue and the like is prevented.

In addition, the present example allows the frequency converter 10 to have small capacity. The 2-shaft gas turbine according to the present example allows the low-pressure turbine generating most of output to rotate at a constant speed. The frequency converter 10 is required by only a high-pressure turbine side on which variable speed operation is performed, and thus the frequency converter 10 can be reduced in capacity.

For example, if output equivalent to 10% of gas turbine rated output is required to be varied in addition to output change according to a fuel flow rate, using the frequency converter 10 with capacity of 10% of the rated output can respond to the requirement. This enables the frequency converter 10 to be reduced in cost.

Operation of the 2-shaft gas turbine 27 to achieve the technique described above will be described below.

In the 2-shaft gas turbine, balance adjustment control is performed to allow energy to be recovered in the high-pressure turbine 2a and energy to be consumed in the compressor 1 to be equal to each other. This control method typically includes varying gas generator rotation speed, and varying a compressor suction air flow rate by adjusting opening of the IGV 9. For example, when rotation speed is higher than a setting value, opening of the IGV 9 is increased to increase the compressor suction air flow rate, and thus the compressor 1 increases in consumption power and decreases in rotation speed. Conversely, reducing the opening of the IGV 9 enables the gas generator 15 to increase in rotation speed.

In output change according to a fuel flow rate, the 2-shaft gas turbine 27 operates as described below. In response to a GT output command (MWD), a GT control device 7a transmits a fuel flow rate command (FFD) to the fuel flow rate control valve 8 to allow required fuel to be supplied to the burner 20 so that output of the generator 5 and recovery energy in the low-pressure turbine 2b are balanced with each other. This controls rotation speed of the power turbine 16 to be substantially constant. Then, energy to be recovered in the high-pressure turbine 2a and energy required to drive the compressor 1 are balanced with each other, and the GT control device 7a controls the opening of the IGV 9 so that rotation speed of the gas generator 15 becomes suitable. As described above, rotation speed of the gas generator 15 is not uniquely determined with respect to output, and thus can be varied.

Figure 2:
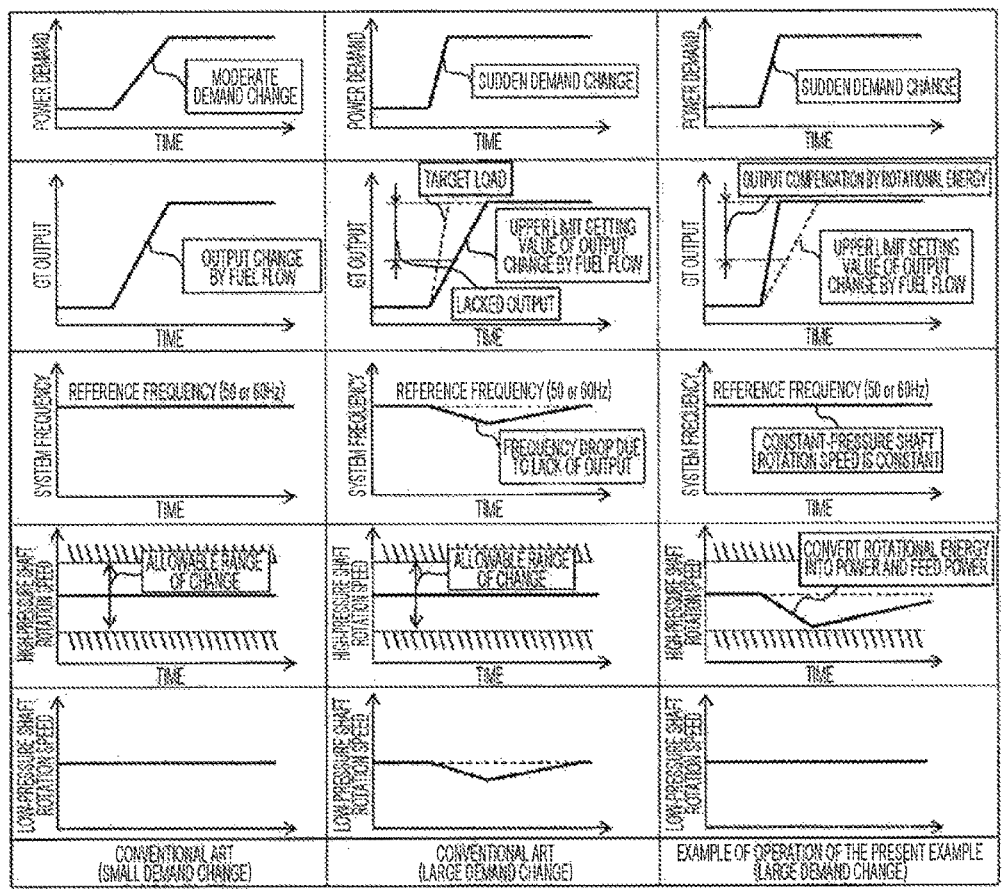
FIG. 2 illustrates an example of an operation pattern of a 2-shaft type gas turbine according to the embodiment of the present invention.

Operation of the gas turbine according to the present example will be described with reference to FIG. 2 for a case where demand increases. There are provided a left row showing operation in a case where demand fluctuation is small in a gas turbine according to a conventional art, a middle row showing operation in a case where demand fluctuation is large in the conventional art, and a right row showing operation in a case where demand fluctuation is large in the gas turbine according to the present example.

In the case where demand fluctuation is small in the gas turbine according to the conventional art, the demand fluctuation can be absorbed by output control according to a fuel flow rate, however, in a case where the demand fluctuation increases, the output change cannot catch up with the demand fluctuation to cause lack of output, and thus rotation speed of the low-pressure turbine shaft 12b is reduced as well as a frequency of a system is reduced.

The gas turbine according to the present example extracts output from the sub-electric motor/generator 6 for the lack of output in the output change according to a fuel flow rate by using the frequency converter 10. While only the control according to a fuel flow rate causes lack of electric power, the present configuration allows rotation speed of the high-pressure turbine shaft 12a to be reduced, and allows rotational energy to be converted into electric power to compensate for the lack of electric power. At this time, opening of the IGV 9 is determined so that power of the compressor 1 and recovery power of the high-pressure turbine 2a are balanced with each other at the reduced rotation speed. In addition, an output frequency of the high-pressure turbine shaft 12a is converted into a reference frequency by the frequency converter 10. This enables a system frequency to be uniform even at the time of sudden change in demand. As the frequency converter 10, a public known inverter/converter and the like are available.

When the gas turbine is configured to balance power of the compressor 1 and recovery power of the high-pressure turbine 2a with each other, specifically when the gas turbine is operated so that the IGV 9 is opened if rotation speed decreases, and the IGV 9 is closed if the rotation speed increases, a suction air flow rate of the compressor 1 becomes substantially constant. Opening the IGV 9 typically improves the compressor 1 in efficiency. At the time, if the rotation speed is reduced during increase in output, for example, compressor efficiency is improved to reduce discharge air temperature of the compressor 1, as well as reduce drive power of the compressor 1. Thus, in addition to output increase caused by fuel increase, the output also increases for reduction in drive power of the compressor 1. In addition, reduction in the discharge air temperature causes temperature of the combustion gas 22 to decrease, and thus gas temperature change with output change can be reduced to enable the compressor 1 to be improved in reliability. Conversely, increase in the rotation speed causes the compressor efficiency to decrease, and thus discharge air temperature of the compressor 1 increases to further increase also drive power of the compressor 1. Thus, in addition to output deterioration caused by combustion reduction, the output also decreases for increase in drive power of the compressor 1. In addition, increase in the discharge air temperature causes temperature of the combustion gas 22 to increase, and thus the gas temperature change with output change can be reduced to enable the compressor 1 to be improved in reliability. Useful combined effect as described above can be obtained.

In design of the compressor, an operating point may be set so that compressor efficiency increases when rotation speed decreases, and the compressor efficiency decreases when the rotation speed increases. This enables useful combined effect similar to the effect above to be obtained.

Increase and decrease in energy caused by change in rotation speed has been described above. Particularly, since renewable energy acquired by wind power generation or solar photovoltaic power generation has large output change, a system in conjunction with the renewable energy has a large fluctuation in a system frequency due to the output change. This kind of fluctuation has relatively alternate increase and decrease, and thus increase and decrease in rotation speed can respond to the fluctuation.

Meanwhile, in a case where atmosphere temperature is high, or output decreases due to aging degradation, the sub-electric motor/generator that is steadily connected to the high-pressure turbine side applies torque to the compressor to increase a mass flow rate of air sucked by the compressor. In fact, it is difficult to clearly divide a cause of output deterioration into that for the aging degradation and that for deterioration by the atmosphere temperature. Then, a deviation in actual output from an MWD is set as a torque command to the sub-electric motor/generator to compensate for the output deterioration. A case of combining a control device will be subsequently described.

Figures 3, 4:
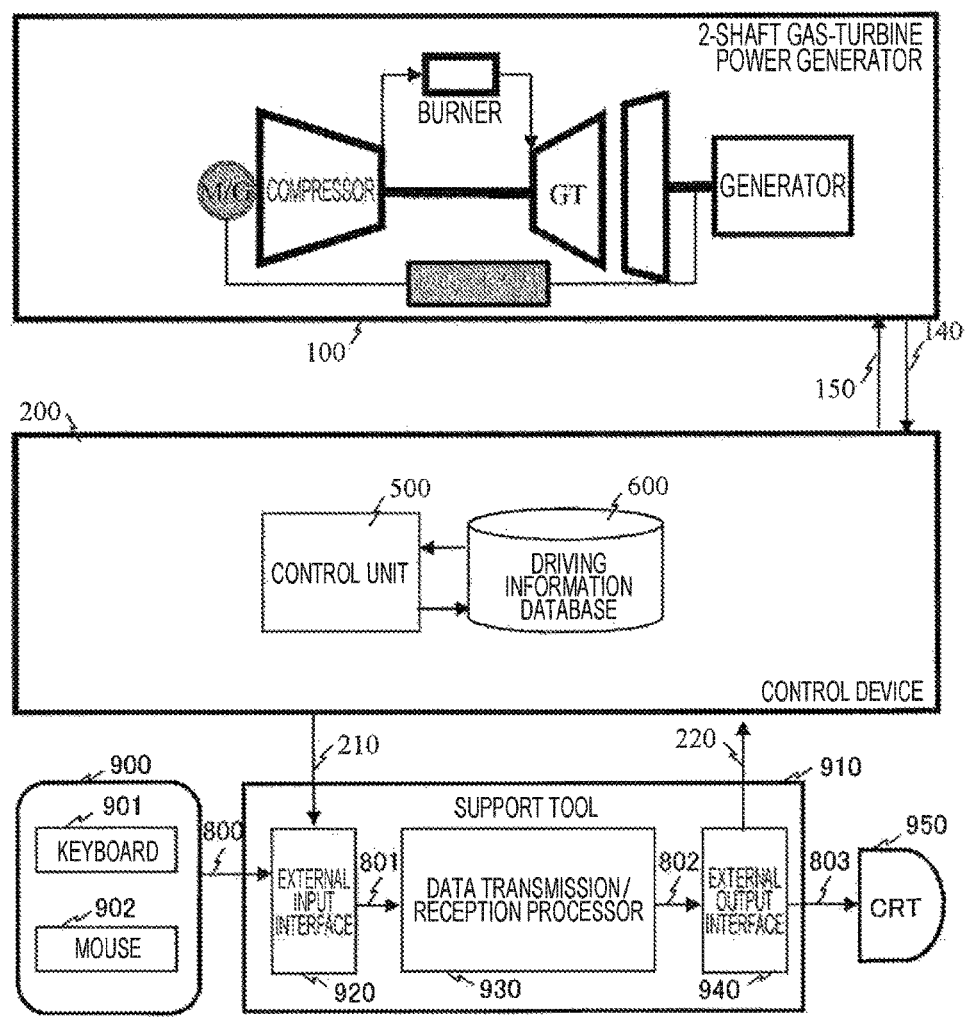
FIG. 3 illustrates a multi-shaft variable speed gas turbine apparatus according to the embodiment of the present invention and an apparatus achieving a method of controlling the gas turbine apparatus.
FIG. 4 illustrates a state of operation data stored in an operation information data base 600 in the multi-shaft variable speed gas turbine apparatus and the method of controlling the gas turbine apparatus according to the embodiment of the present invention.

FIG. 3 illustrates a combination of a 2-shaft gas turbine power generator with variable speed and a control device.

A 2-shaft gas turbine power generator 100 is controlled to be a desired state by receiving a control signal 150 from a control device 200. The control device 200 receives a quantity of state of each unit of the 2-shaft gas turbine power generator 100 as a measurement signal 140.

The control device 200 controls the gas turbine power generator on the basis of the measurement signal 140 therefrom by operating various operation edges so that the various operation edges each become an appropriate operation state with respect to a power generation request. A control unit 500 outputs an appropriate control signal on the basis of the measurement signal 140. The 2-shaft gas turbine is operated for its amount of air and fuel flow rate on the basis of the control signal to control its output. A control signal of the frequency converter is also used in a similar manner. Signals 210 and information generated in the control devices are also outputted to a support tool 910, as needed. Algorithm for acquiring the control signals will be described later in detail.

A user involved in the 2-shaft gas turbine power generator 100 can view various kinds of information related to the gas turbine power generator 100 by using a support tool 910 connected to an input device 900 composed of a keyboard 901 and a mouse 902, and an image display device 950. In addition, the user can access information in the control device 200.

The support tool 910 includes an external input interface 920 to receive the signals 210, a data transmission and reception processing section 930, and an external output interface 940 to output signals 220.

The support tool 910 receives an input signal 800 generated by the input device 900 through the external input interface 920. Likewise, the external input interface 920 also receives information from the control device 200. The data transmission and reception processing section 930 processes the input signal 801 according to information in the input signal 800 from the user, and transmits it to the external output interface 940 as an output signal 802. The output signal 803 is displayed in the image display device 950.

Measurement signals stored in a driving or an operation information database 600 will be described below. Information in a measurement signal that can be acquired from the 2-shaft gas turbine power generator will be described. FIG. 4 illustrates a state of each of operation data items stored in the operation information data base 600. As illustrated in FIG. 4, information measured in 2-shaft gas turbine power generation equipment measurement is stored for each measuring instrument along with each measurement time. PID numbers each are a unique number that is assigned to each measurement value so that the data stored in the operation information data base 600 can be easily used. An alphabet shown under each of the PID numbers is a symbol representing an object to be measured. The object to be measured includes a flow rate value F, a temperature value T, a pressure value P, a power generation output value E, and a density value D, for example. While data is stored in cycles per second in FIG. 4, a sampling period of data collection is different depending on 2-shaft gas turbine power generation equipment to be an object.

Subsequently, an output command to the 2-shaft gas turbine power generator, or model calculation of an MWD to be applied to the 2-shaft gas turbine and an IMWD to be applied to the frequency converter, will be described. A model representing dynamic characteristics of the 2-shaft gas turbine 27 is preset. While dynamic characteristics model based on mass balance of pressure or a flow rate are typically used for the model, modeling by statistic learning represented by a neural network is available. In the dynamic characteristics model of the 2-shaft gas turbine, a maximum rate of load change of the gas turbine is set. Since the 2-shaft gas turbine has a delay caused by mechanical elements, its output lags behind a change pattern of an inputted load. Thus, an output value itself from the 2-shaft gas turbine 27 causes omission of cancellation. The delay is calculated by using the dynamic characteristics model described above. In this case, load-following within the set maximum load rate of change is applied to the dynamic characteristics model, and output itself at the time serves as a MWD to the 2-shaft gas turbine. A value for the omission of cancellation is set as an IMWD to be supplied to the frequency converter.

Figure 5:
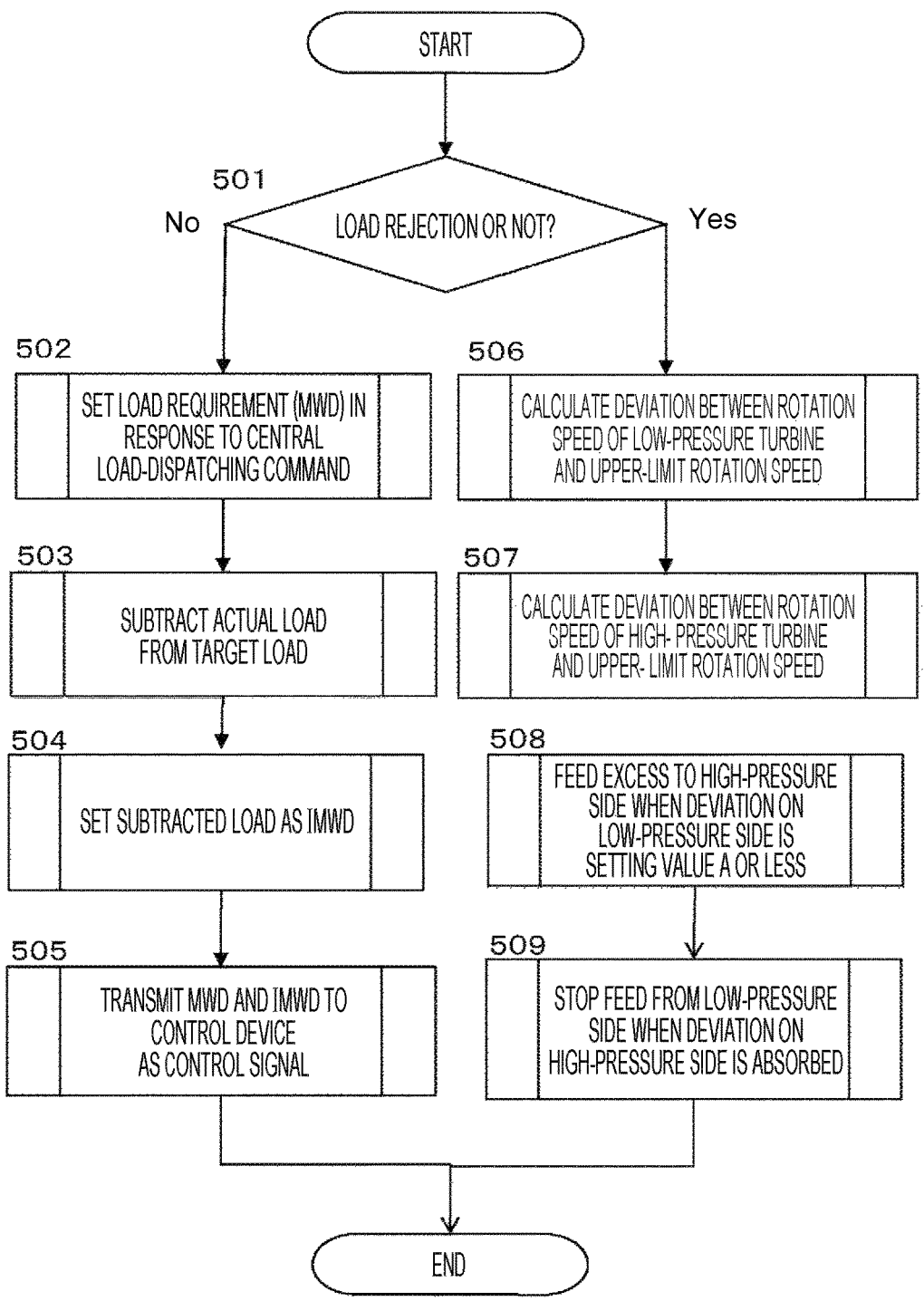
FIG. 5 is a flow chart of generating a power generation command by using a control unit according to the embodiment of the present invention.

In addition, an IMWD used for compensating for output deterioration caused by atmosphere temperature or aging degradation will be described. The IMWD is defined as a deviation between an actual output value of the gas turbine and are MWD. FIG. 5 is a flow chart illustrating operation related to generation of the MWD and the IMWD in the control unit 500.

First, in step 501, it is determined whether a period is during load rejection. If the period is not during load rejection, but during normal operation, processing proceeds to step 502, and if it is during load rejection, the processing proceeds to step 506. In step 502, an MWD to the gas turbine is set in response to a load dispatching center supply command. In step 503, output outputted from the gas turbine is subtracted from the MWD. In step 504, the IMWD is set for the subtracted output. In step 505, the MWD and the IMWD each are transmitted to the 2-shaft gas turbine power generator as a control signal, and the IMWD in addition to the MWD adjusts fuel and air flow rates to compensate for output deterioration by inputting torque to the gas turbine, by using motor drive.

Steps from step 506, being during load rejection, will be sequentially described. In step 506, on the basis of rotation speed of a low-pressure side gas turbine, a deviation from an upper limit value of rotation speed that is preset from a viewpoint of safety protection is acquired. In step 507, on the basis of rotation speed of a high-pressure side gas turbine, a deviation from the upper limit value of rotation speed that is preset from the viewpoint of safety protection of a compressor is acquired. Each of the deviations represents an amount of absorption of surplus energy. In step 508, when the rotation speed on the low-pressure side increases due to load rejection to reduce the deviation to less than a setting value A, surplus energy represented by the deviation is transmitted to the high-pressure side gas turbine. In step 509, since rotation speed on a compressor side increases due to the received energy, as described above, surplus energy is absorbed until reaching the amount of absorption to prevent he rotation speed of the low-pressure side gas turbine from increasing.

Figure 6:
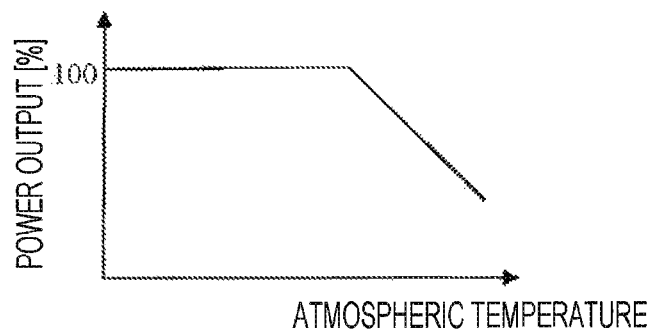
FIG. 6 is a supplement illustrating characteristics of the gas turbine power generator in the flow chart of the control unit according to the embodiment of the present invention.

In the 2-shaft gas turbine power generator in the present example, supplying electricity or applying load to the sub-electric motor/generator 6 (hereinafter referred to as an M/G) connected to the compressor side allows the M/G to serve as a motor or a power generator. Supplying electricity to assist the compressor enables output to be increased even if atmosphere temperature is high. This state is illustrated in FIG. 6. In a case of a certain atmosphere temperature, when an M/G input command is 0, or a normal 2-shaft gas turbine power is used, power generation output decreases from 100%. However, supplying electricity (a right direction in an axis) increases driving force of the compressor to increase an amount of air to be sucked more even if opening of the IGV is fully opened, and thus a mass flow rate increases to enable output to be increased. The output cannot be increased to infinity, and is conversely reduced when fuel injection with increase in output causes combustion temperature to increase to a restrictive temperature at which the fuel injection is reduced.

Figure 7:
FIG. 7 is a supplement illustrating a step of setting a load command to an M/G with respect to atmosphere temperature in the flow chart of the control unit according to the embodiment of the present invention.
Figure 8:
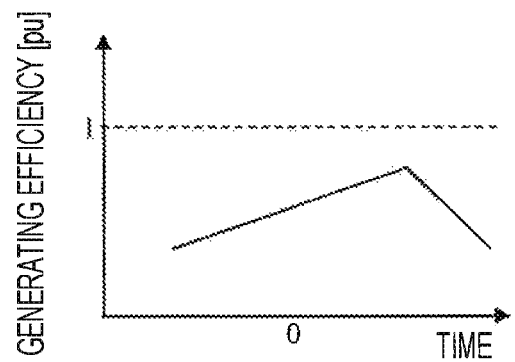
FIG. 8 is a supplement illustrating a step of setting a load command to the M/G at partial load in the flow chart of the control unit according to the embodiment of the present invention.

The same applies to power generation efficiency. As illustrated in FIG. 7, operation with a partial load other than a rated load deteriorates in efficiency. That is, the compressor is designed to have the best efficiency at the rated point. Thus, supplying electricity to the M/G (a right direction in an axis) allows an operating point of the compressor to be close to the rated point, and then efficiency of the compressor increases. In step 505, an optimum amount of assistance to the M/G is determined for each of atmosphere temperature, an aging degradation state, and a partial load state. Specifically, the amount of assistance is determined so that a value of a total of an amount of increase in power generation output and an amount of increase in power generation efficiency, caused by increase in the amount of assistance, become maximum. The total value is not limited. An amount of assistance allowing one of them to be maximum may be determined.

Subsequently, there is described a method of displaying a measurement signal, a control signal, a setting value, and information in the operation information data base 600, in the image display device 950 by allowing a user to use the support tool 910.

FIGS. 9 to 12 each illustrate an example of a screen displayed in the image display device 950.

The user operates, such as inputting a parameter value into a blank field in the screen, by using the keyboard 901 and the mouse 902.

Figure 9:
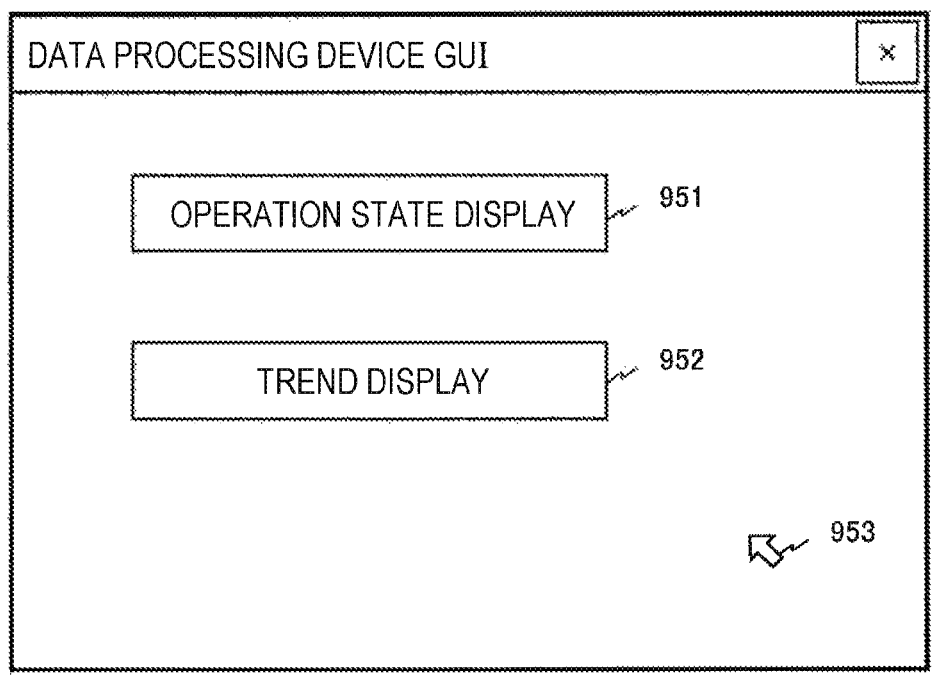
FIG. 9 illustrates an initial screen displayed in an image display device according to the embodiment of the present invention.

FIG. 9 illustrates an initial screen displayed in the image display device 950. The user selects a necessary button from an operation state display button 951 and a trend display button 952, and moves a cursor 953 by using the mouse 902 and click the button by using the mouse 902 to display a desired screen.

Figure 10:
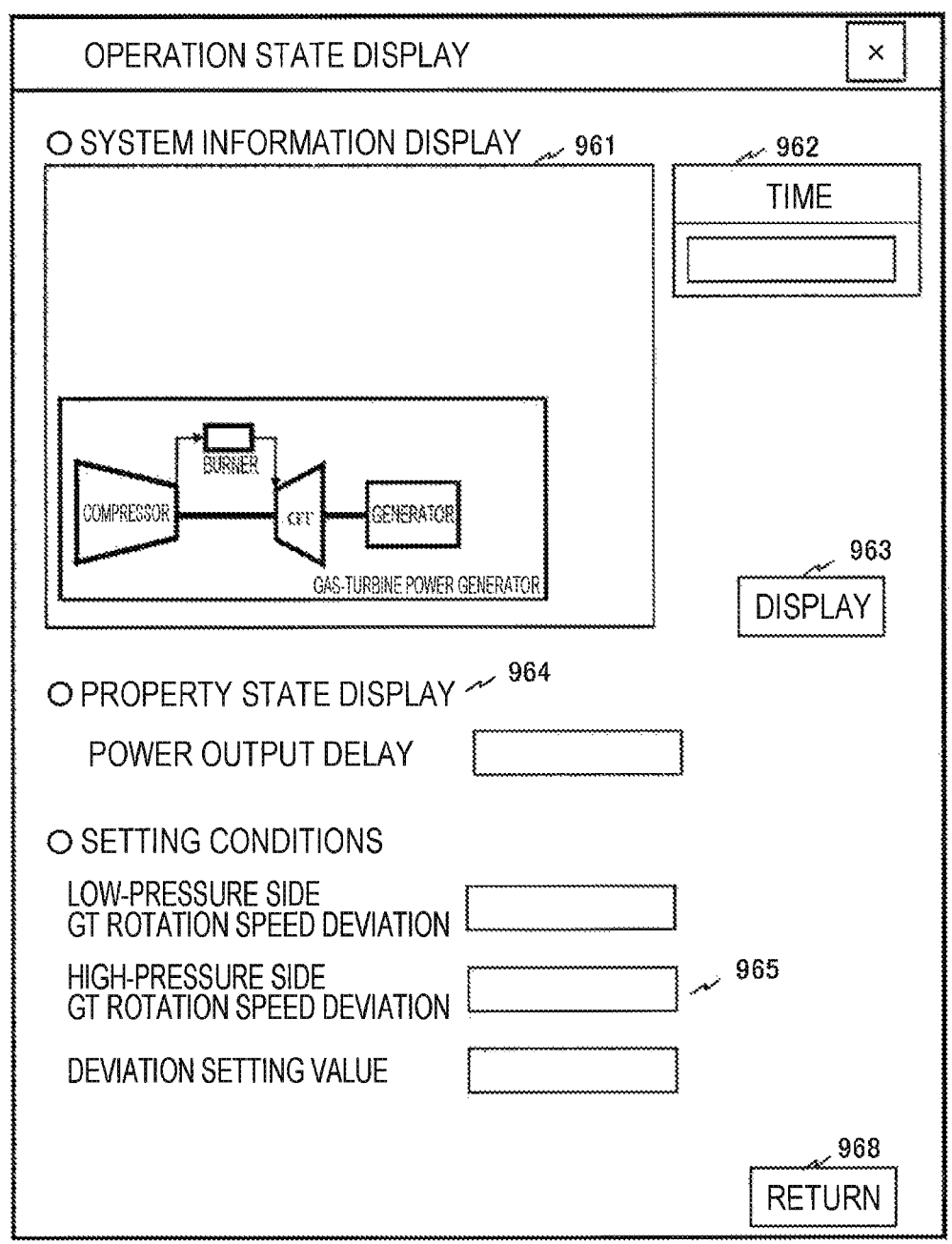
FIG. 10 illustrates a screen showing an operation state displayed in the image display device according to the embodiment of the present invention.

FIG. 10 illustrates a screen of an operation state display. Clicking the operation state display button 951 in FIG. 9 allows the screen of FIG. 10 to be displayed.

In a system information display section 961, the user inputs time to be displayed in an image display device 950 into a time input section 962. Clicking a display button 963 allows various states at the time to be displayed in the display section. Specifically, a state of an apparatus, such as a quantity of state of temperature, pressure, and the like at a portion being measured at present, is displayed. A property state display 964 shows a state of a determination setting value in the flow chart illustrated in FIG. 5. A setting condition 965 displays various conditions in the flow chart illustrated in FIG. 5.

In FIG. 10, clicking a return button 968 enables returning to the screen of FIG. 9.

FIG. 11 illustrates a setting screen for displaying trends in the image display device 950. In FIG. 9, clicking a trend display button 952 allows the screen of FIG. 11 to be displayed. In a measurement signal display section 981, the user inputs a measurement signal or an operation signal to be displayed in the image display device 950 into input sections of the measurement signal display section 981 along with its range (an upper limit and a lower limit). In addition, time to be displayed is inputted into a time input section 982.

Figure 12:
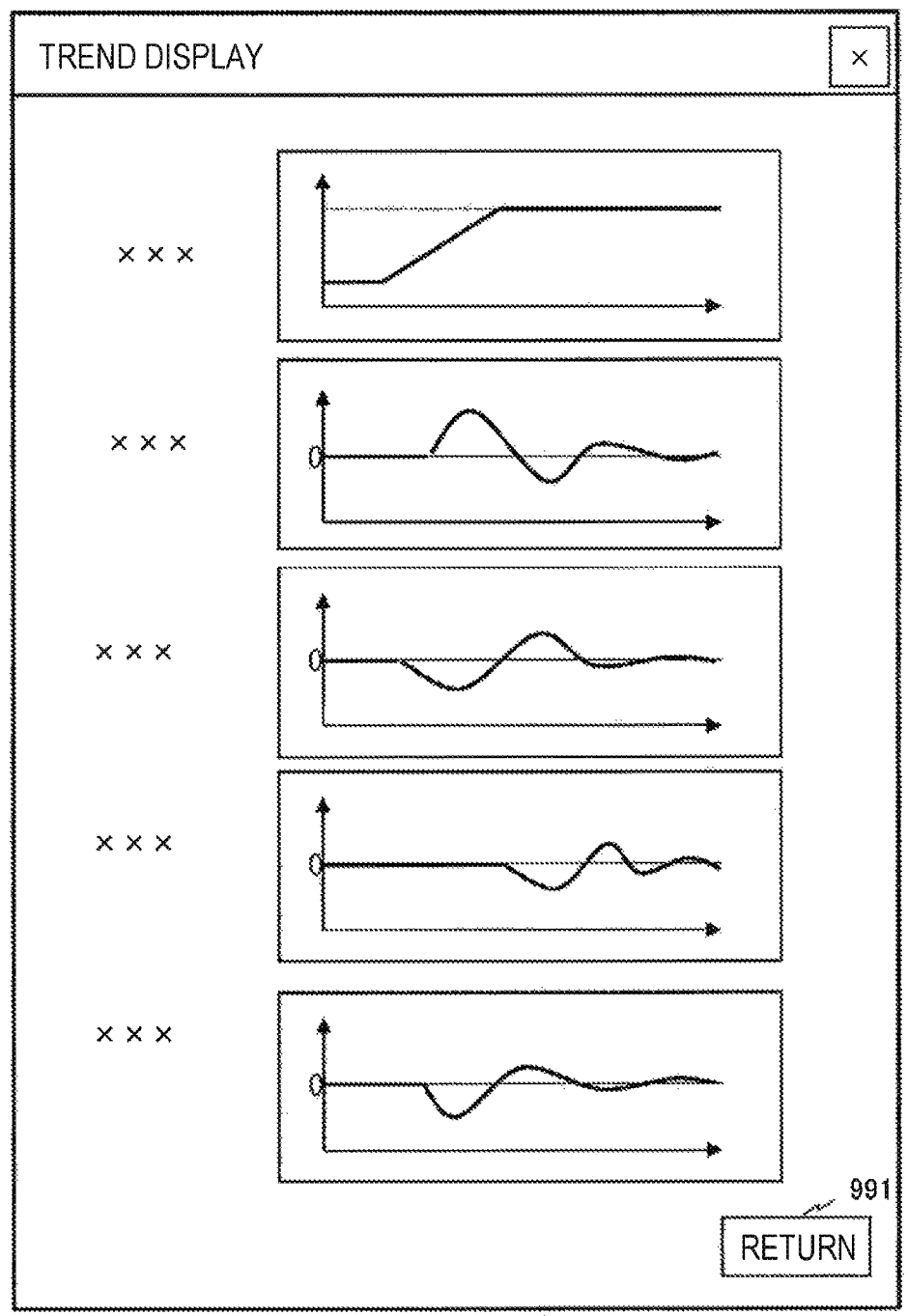
FIG. 12 illustrates trend graphs of various kinds of information in the image display device according to the embodiment of the present invention.

Clicking the display button 983 allows trend graphs to be displayed in the image display device 950 as illustrated in FIG. 12. Clicking a return button 991 in FIG. 12 enables returning to the screen of FIG. 11.

In FIG. 11, clicking a return button 989 enables returning to the screen of FIG. 9.

In every embodiment, while a type including the data base stored in the control device is described, the data base may be configured as an individual device.

In addition, while the example 1 shows only a power generator with a 2-shaft gas turbine, the present invention similarly can be applied to a combined cycle power generator in which a steam turbine is driven by using steam generated by heat exchange using exhaust heat of a gas turbine to generate power generation.

REFERENCE SIGNS LIST

1 compressor
2a high-pressure turbine
2b low-pressure turbine
5 generator
6 sub-electric motor/generator
7a GT control device
8 fuel flow rate control valve
9 IGV
10 frequency converter
12a high-pressure turbine shaft
12b power turbine shaft
14 exhaust
15 gas generator
16 power turbine
18 combustion burn burner
19 burner liner
20 burner
21 compressed air
22 combustion gas
23 cooling air
24 stator vane
25 rotor vane
26a high-pressure turbine rotation speed detector
26b low-pressure turbine rotation speed detector
27 2-shaft type gas turbine
100 gas turbine power generator
200 control device
500 control unit
600 operation information data base
900 input device
901 Keyboard
902 mouse
910 support tool
920 external input interface
930 data transmission and reception processing section
940 external output interface
950 image display device

The invention claimed is:

1. A multi-shaft variable speed gas turbine apparatus comprising:
   a multi-shaft gas turbine, the multi-shaft gas turbine including: a gas turbine compressor; a gas turbine burner; a gas generator provided with a first turbine for rotationally driving the gas turbine compressor; and a power turbine having a second turbine that is mechanically separated from the gas generator, and that is rotationally driven by an exhaust gas of the gas generator, and a main generator;
   a sub-electric motor/generator connected to the gas generator;
   a frequency converter that controls the sub-electric motor/generator;
   a fuel flow rate control means for adjusting output by using a fuel flow rate to be injected into the gas turbine burner;
   a restriction means for restricting variation of the fuel flow rate; and a control device that determines a drive load of the gas turbine compressor in accordance with an output load, and controls the sub-electric motor/generator by using the frequency converter and a surplus energy during load rejection to be transferred to the gas turbine compressor; wherein the control device sets a threshold for a deviation between a rotation speed of the power turbine side and an upper limit rotation speed and transfers a surplus energy corresponding to energy exceeding the threshold to the compressor side.

2. The multi-shaft variable speed gas turbine apparatus according to claim 1, wherein
the control device determines the drive load of the gas turbine compressor by subtracting the output load from the request load.

3. The multi-shaft variable speed gas turbine apparatus according to claim 1, comprising:
a calculation means for calculating each of the request load of the gas turbine and the drive load of the gas turbine compressor to satisfy a target load and a system frequency.

4. The multi-shaft variable speed gas turbine apparatus according to claim 1, having a function of outputting each of a rotation speed of the gas turbine compressor and the drive load of the gas turbine compressor to a display means.

5. A multi-shaft variable speed gas turbine apparatus comprising:
a multi-shaft gas turbine, the multi-shaft gas turbine including: a gas turbine compressor; a gas turbine burner; a gas generator provided with a first turbine for rotationally driving the gas turbine compressor; and a power turbine having a second turbine that is mechanically separated from the gas generator, and that is rotationally driven by an exhaust gas of the gas generator, and a main generator;
a sub-electric motor/generator connected to the gas generator;
a frequency converter that controls the sub-electric motor/generator;
a fuel flow rate control means for adjusting output by using a fuel flow rate to be injected into the gas turbine burner;
a restriction means for restricting variation of the fuel flow rate; and
a control device that controls surplus energy during load rejection to be transferred to the gas turbine compressor; wherein
the control device sets a threshold for a deviation between a rotation speed of the power turbine side and an upper limit rotation speed and transfers a surplus energy corresponding to energy exceeding the threshold to the compressor side.

6. The multi-shaft variable speed gas turbine apparatus according to claim 5, wherein
the control device calculates a deviation between a rotation speed on the compressor side and an upper limit rotation speed of the compressor and transfers a surplus energy corresponding to the deviation from the power turbine side.

7. A method of controlling a multi-shaft variable speed gas turbine apparatus provided with:
a multi-shaft gas turbine, the multi-shaft gas turbine including: a gas turbine compressor; a gas turbine burner; a gas generator provided with a first turbine for rotationally driving the gas turbine compressor; and a power turbine having a second turbine that is mechanically separated from the gas generator, and that is rotationally driven by an exhaust gas of the gas generator, and a main generator;
a sub-electric motor/generator connected to the gas generator; a frequency converter that controls the sub-electric motor/generator;
a fuel flow rate control means for adjusting output by using a fuel flow rate to be injected into the gas turbine burner; and
a restriction means for restricting variation of the fuel flow rate, the method comprising:
determining a drive load of the gas turbine compressor in accordance with an output load;
controlling the sub-electric motor/generator by using the frequency converter and a surplus energy during load rejection to be transferred to the gas turbine compressor; and
setting a threshold for a deviation between a rotation speed of the power turbine side and an upper limit rotation speed and transferring a surplus energy corresponding to energy exceeding the threshold to the compressor side.

8. A multi-shaft variable speed gas turbine apparatus comprising:
a multi-shaft gas turbine, the multi-shaft gas turbine including: a gas turbine compressor; a gas turbine burner; a gas generator provided with a first turbine for rotationally driving the gas turbine compressor; and a power turbine having a second turbine that is mechanically separated from the gas generator, and that is rotationally driven by an exhaust gas of the gas generator, and a main generator;
a sub-electric motor/generator connected to the gas generator;
a frequency converter that controls the sub-electric motor/generator;
a fuel flow rate control means for adjusting output by using a fuel flow rate to be injected into the gas turbine burner;
a restriction means for restricting variation of the fuel flow rate; and
a control device that controls surplus energy during load rejection to be transferred to the gas turbine compressor; wherein
the control device calculates a deviation between a rotation speed on the compressor side and an upper limit rotation speed of the compressor and transfers a surplus energy corresponding to the deviation from the power turbine side.

* * * * *